No. 692,368. Patented Feb. 4, 1902.
F. J. SEDDON.
PNEUMATIC TIRE.
(Application filed Apr. 15, 1901.)

(No Model.)

WITNESSES
W J Barker
Anna P. McCole.

INVENTOR
F. J. SEDDON.
By Edward P. Thompson
atty

UNITED STATES PATENT OFFICE.

FREDERICK JAMES SEDDON, OF MANCHESTER, ENGLAND.

PNEUMATIC TIRE.

SPECIFICATION forming part of Letters Patent No. 692,368, dated February 4, 1902.

Application filed April 15, 1901. Serial No. 55,967. (No model.)

*To all whom it may concern:*

Be it known that I, FREDERICK JAMES SEDDON, a subject of the King of Great Britain, residing at 846 Rochdale road, Manchester, in the county of Lancaster, England, have invented certain new and useful Improvements in Pneumatic Tires, of which the following is a specification.

This invention relates to pneumatic tires for the wheels of vehicles for common roads and more particularly to air-tubes therefor, having a continuous air-circulation and made with a detachable joint at one part in the tube or annular ring; and it consists in the improved arrangement of a mechanical permanently air-tight joint for connecting the ends of the tube, which nevertheless can be easily disconnected, in consequence of which improvement the air-tube can be made with several such joints or composed of a number of sections, so that any segment becoming damaged can be detached and another similar segment be inserted in place thereof, while in all cases the air can circulate around the pneumatic tube as in the ordinary tubes in general use.

The particular form of joint I employ is peculiarly adapted to withstand the contortions the pneumatic tube assumes in cross-section while rotating under the load without permitting the air to escape, the air-pressure on both sides of the joint tending to keep the joint closed.

The sheet of drawings annexed hereunto illustrates the carrying out of my invention.

Figure 1:
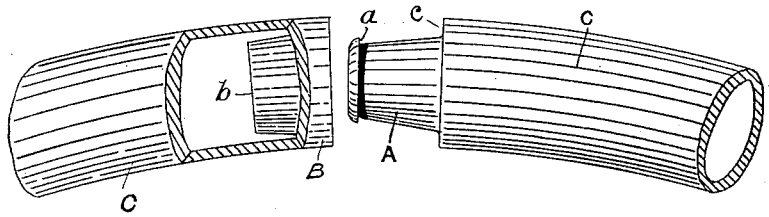
Figure 2:
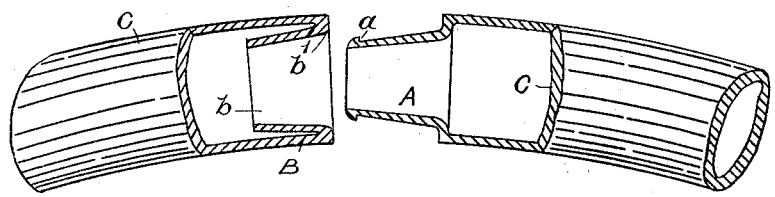
Figure 3:
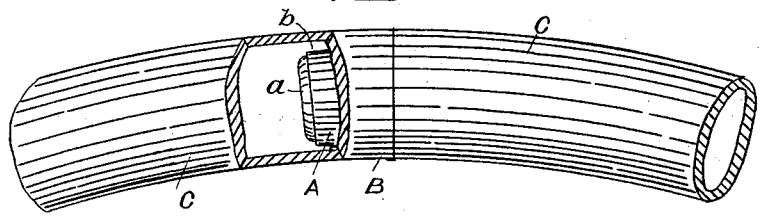

Figure 1 represents the improved joint partly in section and with its parts disjointed. Fig. 2 represents the parts of the joints also disjointed but in section. Fig. 3 represents the joint made and is also shown partly in section.

As the pneumatic tubes are generally circular in cross-section, no cross-sectional view is shown or needed.

The parts of the joint are preferably formed in a mold in the manner well known in the art of india-rubber manufacture. An annular pneumatic tube may have one such joint, or the said tube may be formed in segments of a circle, each segment being alike and having the spigot formed at one end and the socket at the other, or the segments may be made in pairs, one segment of each pair having a spigot at each end and the other segment of the pair having a socket at each end. A non-return inflating-valve is fixed on one part of the annular tube or in one segment thereof in the well-known way.

Referring now to the several views of the drawings, one part of the joint consists of a preferably slightly-tapered spigot or nozzle A, of less diameter at the root than the body of the tube C by preference, forming thereby an annular shoulder $c$. The end of the nozzle is preferably formed with a shallow annular rim or flange $a$. The nozzle is formed thicker in section or stiffer than the body of the pneumatic tube need be, so that it will not readily double up during its insertion into the socket. In practice the nozzle will first be made independently of the body of the tube C, and before the manufacture is completed will be joined thereto. The body C may be of less diameter than the largest part of the joint—say at the shoulder—and being thinner will expand upon pressure. The socket B is also preferably formed larger than the body C and of the same external diameter as that of the shoulder $c$ of the nozzle. The socket consists of an internal sleeve $b$, forming a hollow frustum of a cone joined at its base to the body of the socket B at the end thereof $b'$. The length of the sleeve $b$ corresponds with the distance between the shoulder $c$ and the flange $a$ of the nozzle, and the internal diameters of the said sleeve are the same or slightly less than the external diameters of the nozzle between the parts $a$ and $c$. Preferably the wall of the sleeve is thinner than that of the nozzle. By this construction an annular cavity or space is provided, which is occupied by air under pressure when the tire is inflated.

The joint is easily and quickly made by pushing the nozzle A into the socket B until the flange $a$ of the nozzle protrudes through sleeve $b$, thereby securing the parts and preventing their creeping apart.

On inflation the pressure of the air upon the annular surfaces of the nozzles, the area of which is equal to the difference of the internal sectional area of the tube C and the area of the opening at the end of the nozzle, forces the spigot A into the socket B and holds it therein, while at the same time the socket and spigot are pressed together by the pressure acting upon their exposed surfaces.

The pressure of air upon the outside of the sleeve and upon the inside of the nozzle being always the same and the joint having a long bearing, there is no possibility of escape through the joint and no tendency for it to open when the pneumatic tube is contorted under the weight of the load, as the end where the air would first have to effect its escape is removed from the contorted parts. Instead of the nozzle A being formed with a shallow rim or flange $a$ it may have an annular projection at any other part and the socket B be formed with an annular internal recess adapted to receive this projection, or the nozzle may be formed with an annular outside recess and the socket with an annular internal projection fitting into said recess, the object of these engaging devices being to hold the air-tube together after putting it into the tire-cover prior to inflation, after which the latter will keep the parts connected.

The pneumatic tube is especially adapted to tires having separate covers; but it may be formed into a single-tube tire by providing it with a jacket of canvas secured thereto and a wearing-surface of india-rubber.

I claim as my invention—

A disconnectible joint for the pneumatic tubes of wheel-tires, consisting of a tapered spigot A of less diameter at the root than the body of the tube C, forming thereby an annular shoulder $c$, the end of the spigot being formed with an annular rim or flange $a$, a sleeve forming a frustum of a cone joined at its base to the body of a second tube C, and corresponding in length with the distance between the shoulders $c$ and the flange $a$, and the internal diameter being about the same as the external diameter of said nozzle between the parts $a$ and $c$, said sleeve and spigot being thin enough and tapered enough to permit the external air-pressure to act centrally upon the external surface of said sleeve, and both the nozzle and sleeve being open throughout their diameters.

In witness whereof I have hereunto set my hand in the presence of two witnesses.

FREDERICK JAMES SEDDON.

Witnesses:
R. J. URQUHART,
C. BOLLÉ.